（12）United States Patent
Maida et al.

(10) Patent No.: US 11,554,804 B1
(45) Date of Patent: Jan. 17, 2023

(54) TELESCOPE DRIVE BRACKET WITH ANTI-ROTATION FEATURES

(71) Applicant: Steering Solutions IP Holding Corporation, Saginaw, MI (US)

(72) Inventors: Robert D. Maida, Pinconning, MI (US); Timothy D. Beach, Saginaw, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 0 days.

(21) Appl. No.: 17/406,192

(22) Filed: Aug. 19, 2021

(51) Int. Cl.
*B62D 1/18* (2006.01)
*B62D 1/185* (2006.01)

(52) U.S. Cl.
CPC .............. *B62D 1/18* (2013.01); *B62D 1/185* (2013.01)

(58) Field of Classification Search
CPC .................................. B62D 1/18; B62D 1/185
See application file for complete search history.

(56) References Cited

U.S. PATENT DOCUMENTS

| | | | | |
|---|---|---|---|---|
| 9,663,136 B2 * | 5/2017 | Stinebring | ............ | B62D 1/195 |
| 9,744,983 B2 * | 8/2017 | Stinebring | ............ | B62D 1/185 |
| 11,001,292 B2 * | 5/2021 | Derocher | ............ | B62D 1/195 |
| 2015/0251683 A1 * | 9/2015 | Caverly | ............ | B62D 1/181 |
| | | | | 74/493 |
| 2016/0046318 A1 * | 2/2016 | Stinebring | ............ | B62D 1/181 |
| | | | | 74/493 |
| 2017/0174249 A1 * | 6/2017 | Stinebring | ............ | B62D 1/181 |
| 2018/0050720 A1 * | 2/2018 | King | ............ | B62D 1/184 |
| 2018/0099687 A1 * | 4/2018 | Stinebring | ............ | B62D 1/195 |
| 2019/0126968 A1 * | 5/2019 | Messing | ............ | B62D 1/181 |

FOREIGN PATENT DOCUMENTS

| | | | | |
|---|---|---|---|---|
| CN | 108045428 A | * | 5/2018 | ............ B62D 1/181 |
| EP | 3628566 A1 | * | 4/2020 | ............ B62D 1/183 |

* cited by examiner

*Primary Examiner* — Nicole T Verley
(74) *Attorney, Agent, or Firm* — Dickinson Wright PLLC (57) ABSTRACT

A steering column assembly includes a lower jacket, an upper jacket in telescoping engagement with the lower jacket, and a telescope actuator assembly. The telescope actuator assembly includes a jackscrew nut translatable along a lead screw. The telescope actuator assembly includes a telescope drive bracket having a base portion and a pair of arms extending from the base portion, the pair of arms each defining a slot with a respective slot surface, wherein the jackscrew nut is disposed within the slots. The telescope actuator assembly includes a first nut capture plug coupled to one of the pair of arms, the first nut capture plug having at least one tooth disposed within a cavity on a first side of the jackscrew nut to prevent relative rotation between the jackscrew nut and the telescope drive bracket.

18 Claims, 7 Drawing Sheets

TELESCOPE DRIVE BRACKET WITH ANTI-ROTATION FEATURES

FIELD OF THE INVENTION

The embodiments described herein relate to vehicle steering systems and, more particularly, to a telescope drive bracket with anti-rotation features.

BACKGROUND

A steering column assembly of a vehicle may be adjustable in a rake (tilt) direction and/or in a telescoping direction. Each of these adjustments may be carried out with respective power assemblies or mechanisms. Typical telescope drive systems may include a telescope drive bracket mounted to a column jacket. The telescope drive system is mounted rigidly at one location, while another location moves in a linear direction, thus driving the component it is fixed to, resulting in a desired telescope travel.

During a collapse event (e.g., energy absorption event) of some steering columns, the telescope drive bracket tends to rotate from its design position to a final position. This action is not a desirable outcome.

SUMMARY

According to one aspect of the disclosure, a steering column assembly includes a lower jacket. The steering column assembly also includes an upper jacket in telescoping engagement with the lower jacket. The steering column assembly further includes a telescope actuator assembly. The telescope actuator assembly includes a jackscrew nut translatable along a lead screw. The telescope actuator assembly also includes a telescope drive bracket having a base portion and a pair of arms extending from the base portion, the pair of arms each defining a slot with a respective slot surface, wherein the jackscrew nut is disposed within the slots in an assembled condition to move the upper jacket in a telescope direction relative to the lower jacket. The telescope actuator assembly further includes a first nut capture plug coupled to one of the pair of arms, the first nut capture plug having at least one tooth disposed within a cavity on a first side of the jackscrew nut to prevent relative rotation between the jackscrew nut and the telescope drive bracket.

According to another aspect of the disclosure, a telescope actuator assembly includes a jackscrew nut translatable along a lead screw. The telescope actuator assembly also includes a telescope drive bracket in contact with the jackscrew nut. The telescope actuator assembly further includes a nut capture plug coupled to the telescope drive bracket, the nut capture plug having a first tooth and a second tooth, the first tooth disposed within a first cavity on a side of the jackscrew nut, the second tooth disposed within a second cavity on the side of the jackscrew nut, wherein disposal of the first tooth and the second tooth within the first and second cavities prevents relative rotation between the jackscrew nut and the telescope drive bracket.

According to yet another aspect of the disclosure, a telescope actuator assembly includes a jackscrew nut translatable along a lead screw. The telescope actuator assembly also includes a telescope drive bracket in contact with the jackscrew nut. The telescope actuator assembly further includes a nut capture plug coupled to the telescope drive bracket, the nut capture plug having a single tooth, the single tooth disposed within a cavity on a side of the jackscrew nut, wherein disposal of the first tooth and the second tooth within the first and second cavities prevents relative rotation between the jackscrew nut and the telescope drive bracket.

These and other advantages and features will become more apparent from the following description taken in conjunction with the drawings.

BRIEF DESCRIPTION OF THE DRAWINGS

The subject matter that is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Referring now to the Figures, where the invention will be described with reference to specific embodiments, without limiting same, illustrated are embodiments of a telescope actuator assembly that includes a nut capture plug which interfaces with a jackscrew nut to prevent rotation of a telescope drive bracket during an energy absorption event.

Figure 1:
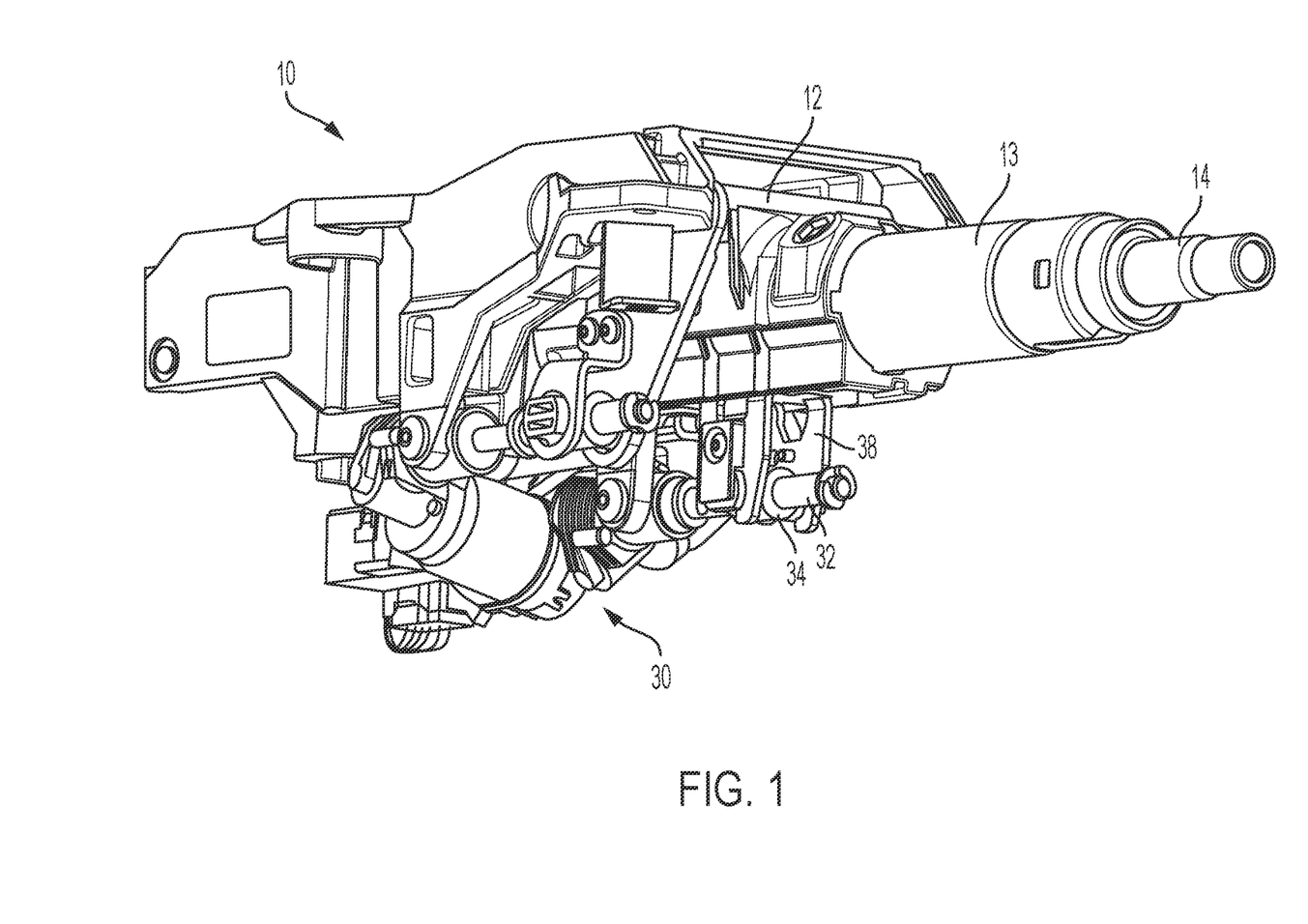
FIG. 1 is perspective view of a first side of a steering column assembly.
Figure 2:
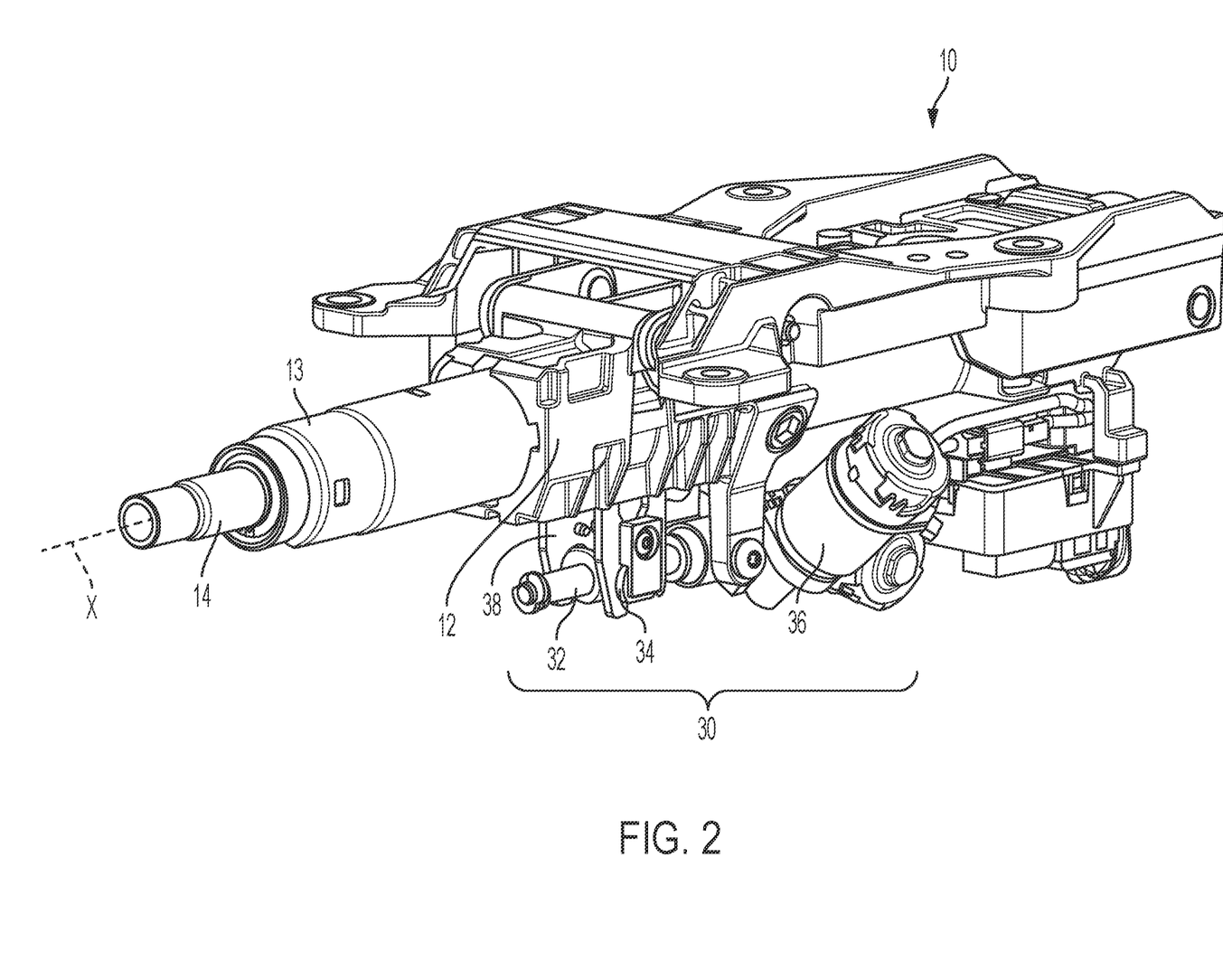
FIG. 2 is perspective view of a second side of the steering column assembly.

FIGS. 1 and 2 illustrate a steering column assembly generally indicated with numeral 10. The steering column assembly 10 is for a vehicle and extends along a longitudinal axis X. The steering column assembly 10 may be adjustable in a telescopic direction generally parallel with the longitudinal axis X (i.e., adjustable along the longitudinal axis X), and may be adjustable in a rake/tilt direction in some embodiments. The steering column assembly 10 includes a lower jacket 12, an upper jacket 13, and a steering shaft 14 extending along the longitudinal axis X. The steering shaft 14 and the upper jacket 13 are operatively coupled to each other and disposed in telescoping engagement with the lower jacket 12. In other words, the steering shaft 14 has a portion disposed within the upper jacket 13 and a portion disposed within the lower jacket 12. The upper jacket 13 has a portion extending into the lower jacket 12 and is translatable therein.

A telescope actuator assembly 30 is provided to facilitate powered telescope adjustments of the upper jacket 13 and the steering shaft 14. The telescope actuator assembly 30 includes a leadscrew 32 having a nut 34 threaded thereto. The nut 34 is referred to as a jackscrew nut 34 herein. A motor 36 rotatably drives the leadscrew 32 to translate the jackscrew nut 34 therealong. The jackscrew nut 34 is operatively coupled to the upper jacket 13 with a telescope drive bracket 38, such that linear movement of the jackscrew nut 34 along the leadscrew 32 drives the upper jacket 13 to and from different telescope positions.

Figure 3:
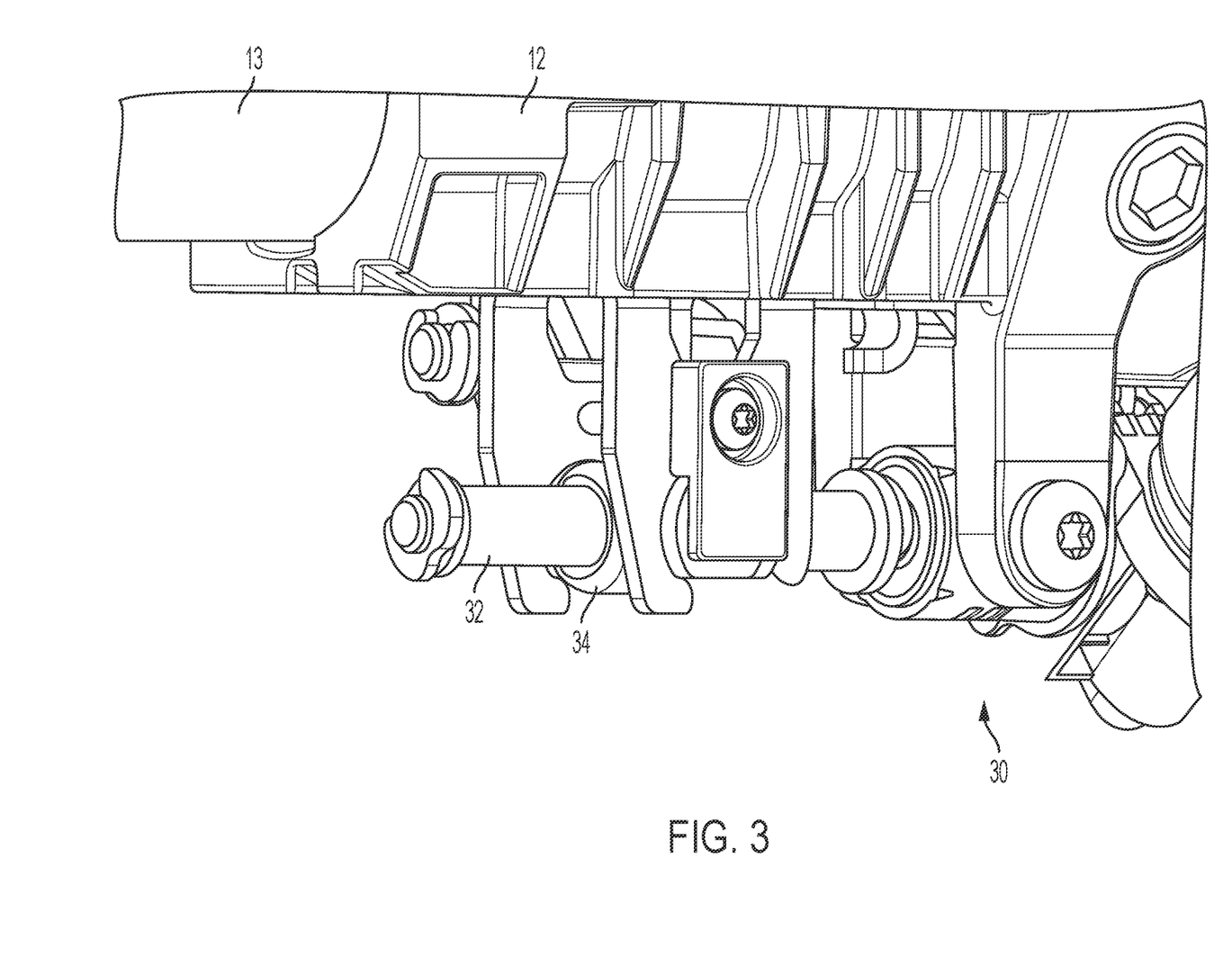
FIG. 3 is perspective view of a portion of a telescope actuator assembly of the steering column assembly.

As shown in FIGS. 1-3, the above-described components of the telescope actuator assembly 30 are substantially positioned on a lower side of the steering column assembly 10. However, it is contemplated that other orientations are desirable.

Figure 4:
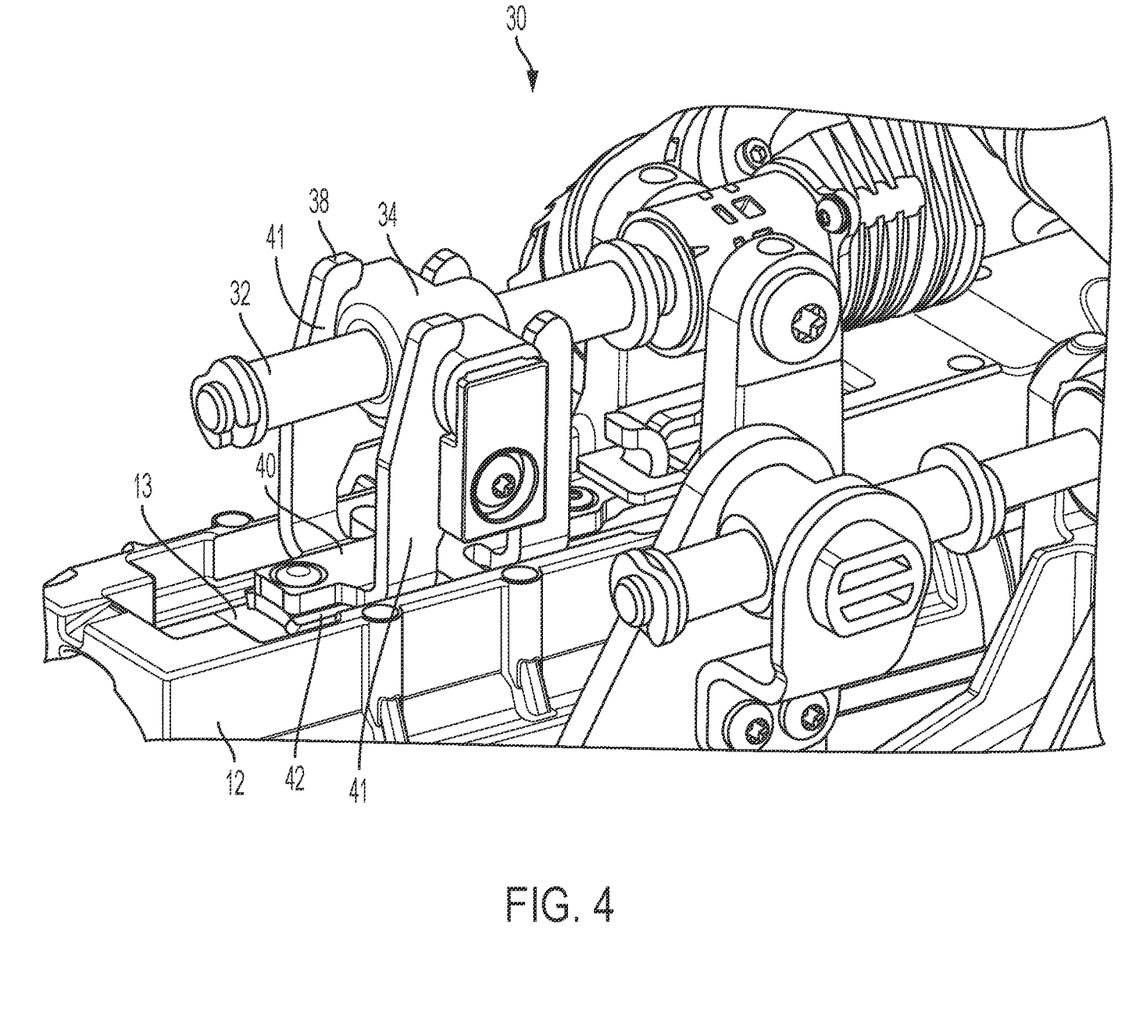
FIG. 4 is another perspective view of the telescope actuator assembly.
Figure 5:
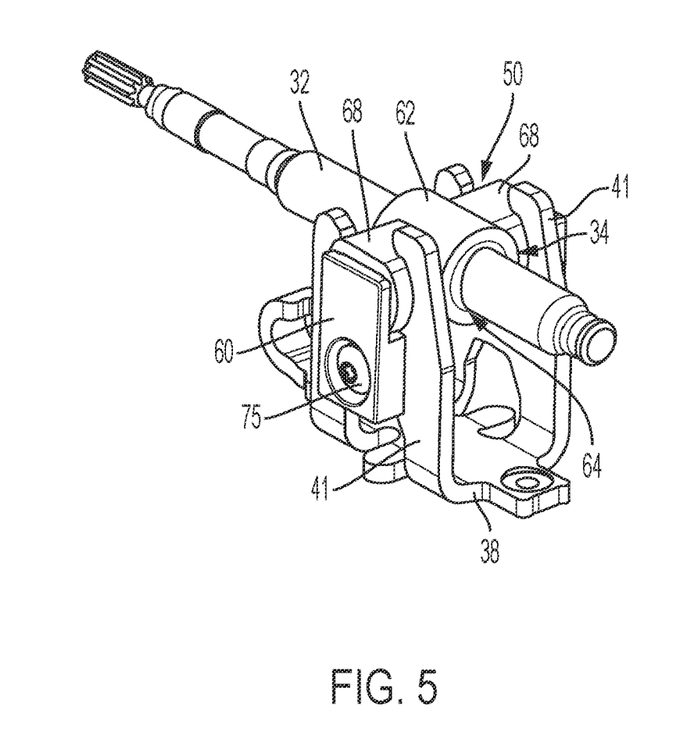
FIG. 5 is a perspective view of the telescope actuator assembly according to one aspect of the disclosure.
Figure 6:
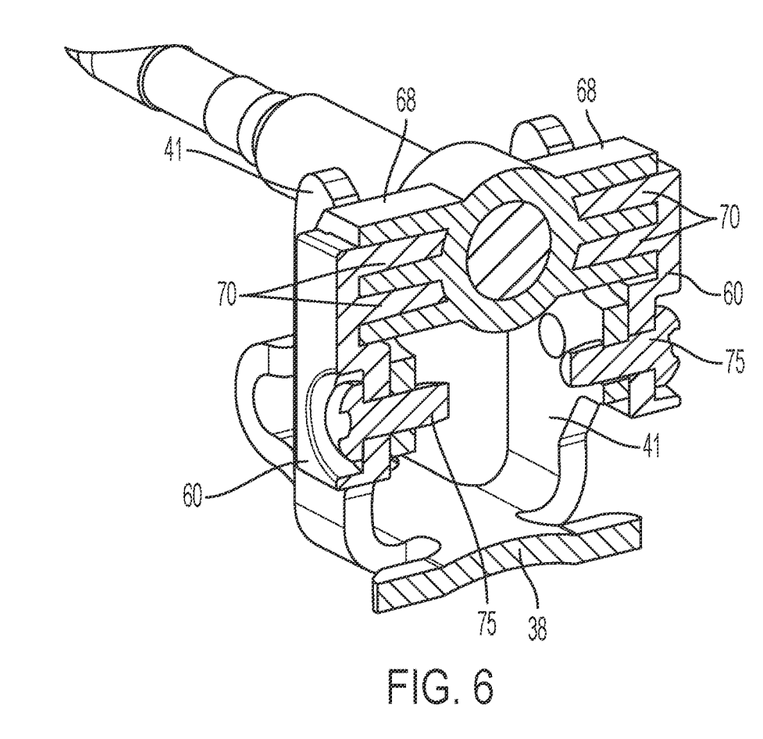
FIG. 6 is a partial, cross-sectional view of the telescope actuator assembly of FIG. 5.
Figure 7:
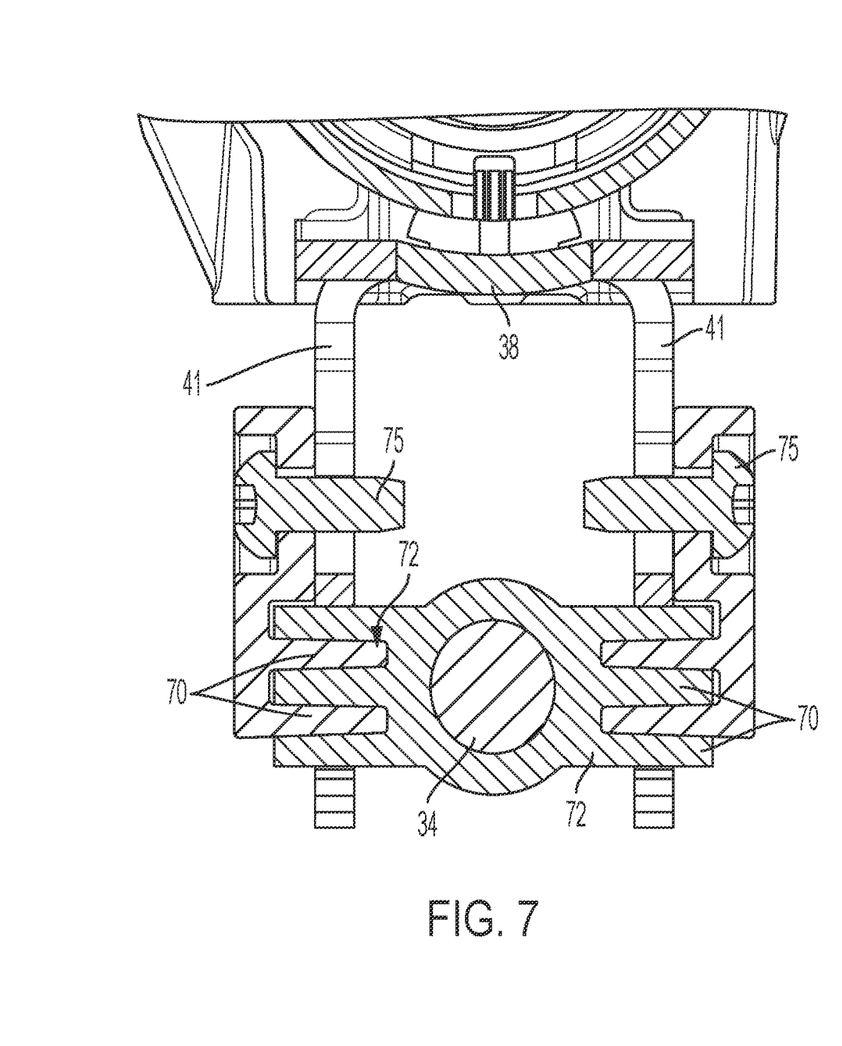
FIG. 7 is a cross-sectional, end view of the telescope actuator assembly of FIG. 5.
Figure 8:
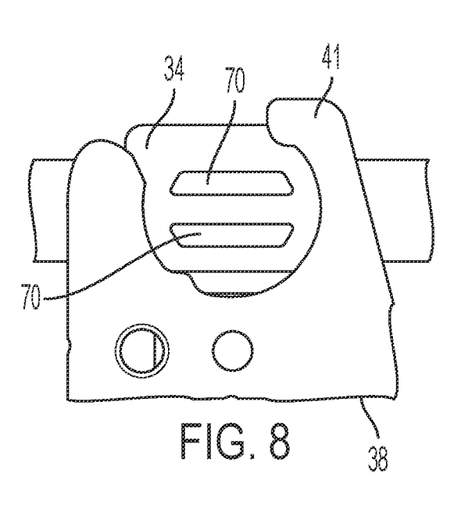
FIG. 8 is a cross-sectional, side view of the telescope actuator assembly of FIG. 5.
Figure 9:
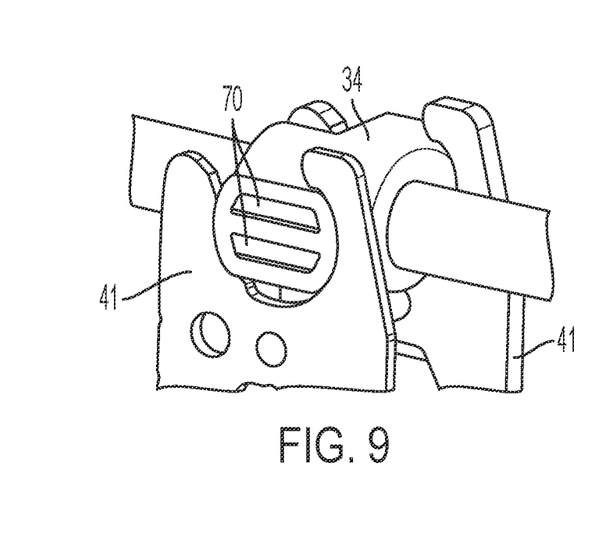
FIG. 9 is a cross-sectional, perspective view of the telescope actuator assembly of FIG. 5.

Referring now to FIG. 4, a portion of the telescope actuator assembly 30 is shown in greater detail, with the orientation of the steering column assembly 10 being rotated to illustrate the telescope actuator assembly 30 in additional detail. In particular, the telescope drive bracket 38 includes a base portion 40 and a pair of arms 41 extending parallel to each other and away from the base portion 40. The base portion 40 extends longitudinally in a direction substantially parallel to the longitudinal axis X. While it is contemplated that the base portion 40 of the telescope drive bracket 38 may be directly secured to an outer surface of the upper jacket 13, a plate 42 is provided in some embodiments, as illustrated. The plate 42 may be welded to the upper jacket 13 in some embodiments, but other securing processes are contemplated. The plate 42 provides additional material thickness to better facilitate mechanical fastening of the telescope drive bracket 38—and/or possible other components—to the upper jacket 13. The base portion 40 of the telescope drive bracket 38 may be fastened to the plate 42 and upper jacket 13 with bolts, rivets or the like.

As shown, the telescope drive bracket 38 is a single, integrally formed component. In some embodiments, the telescope drive bracket 38 is a stamped component. The telescope drive bracket defines a slot 50 defined by each of the arms 41. The slot 50 is dimensioned to receive the jackscrew nut 34 of the telescope actuator assembly 30 therein.

Referring now to FIGS. 5-9, the telescope actuator assembly 30 is shown with a first embodiment of a nut capture plug 60. The nut capture plug 60 is provided to ensure that the jackscrew nut 34 is locked in place and to prevent the jackscrew nut 34 from rotating once the nut capture plug 60 is assembled thereto.

The jackscrew nut 34 has a main body 62 that defines a central aperture 64. The inner wall which defines the central aperture 64 has threading that couples the leadscrew 32 thereto. A pair of lateral portions 68 extend from the main body 62 and are the portions of the jackscrew nut 34 that are positioned within the slot 50 of each arm 41 of the telescope drive bracket 38. The outer geometry of the lateral portions 68 correspond to the inner walls of the telescope drive bracket that define the slots 50, such that the lateral portions 68 do not rotate relative to the telescope drive bracket 38 during typical adjustment operations.

The nut capture plug 60 is mounted to the arm 41 of the telescope drive bracket 38. Although illustrated and described herein as having a nut capture plug 60 on each side of the telescope drive bracket 38, it is contemplated that only one side (i.e., one arm 41) of the bracket has a nut capture plug 60 mounted thereto. In the illustrated embodiments, each nut capture plug 60 is operatively coupled to the respective arm 41 of the telescope drive bracket 38. In particular, a mechanical fastener 75 extends through the nut capture plug 60 and into the arm 41 of the telescope drive bracket 38. It is to be understood that other coupling methods may be employed to secure the nut capture plug 60 to the telescope drive bracket 38.

As shown best in the cross-sectional views of FIGS. 6-9, each nut capture plug 60 includes multiple teeth 70 that extend into cavities 72 of each lateral portion 68 of the jackscrew nut 34. While each nut capture plug 60 is shown as having two teeth 70, it is contemplated that a different number of teeth may be present on each nut capture plug. The teeth 70 have a shape that substantially corresponds to the geometry of the cavities 72, such that relative movement between the jackscrew nut 34 and the nut capture plug 60 is restricted or eliminated. In some embodiments, a press fit condition is provided by the size and shape of the teeth 70 and the cavities 72, thereby locking the jackscrew nut 34 in place, relative to the telescope drive bracket 38 in an assembled condition.

In some embodiments, the nut capture plug 60 is formed of powdered metal, but it is to be understood that alternative materials may be utilized in other embodiments.

Figure 10:
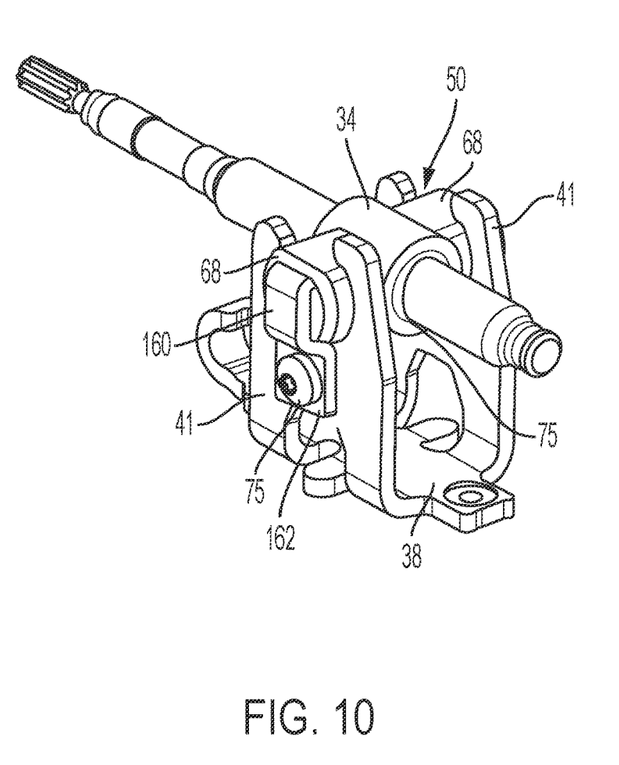
FIG. 10 is a perspective view of the telescope actuator assembly according to another aspect of the disclosure.
Figure 11:
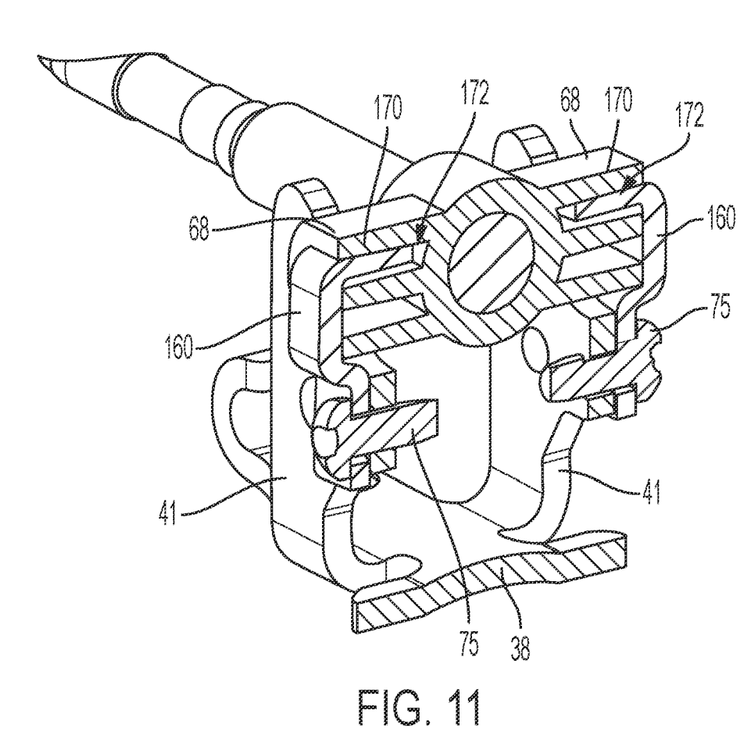
FIG. 11 is a partial, cross-sectional view of the telescope actuator assembly of FIG. 10.

Referring to FIGS. 10 and 11, the telescope actuator assembly 30 is shown with a second embodiment of a nut capture plug 160. The nut capture plug 160 is provided to ensure that the jackscrew nut 34 is locked in place and to prevent the jackscrew nut 34 from rotating once the nut capture plug 160 is assembled thereto.

In the embodiment of FIGS. 10 and 11, the nut capture plug 160 is a stamped component that includes a first segment 162 mounted to the arm 41 of the telescope drive bracket 38. Although illustrated and described herein as having a nut capture plug 160 on each side of the telescope drive bracket 38, it is contemplated that only one side (i.e., one arm 41) of the bracket has a nut capture plug 160 mounted thereto. In the illustrated embodiments, each nut capture plug 160 is operatively coupled to the respective arm 41 of the telescope drive bracket 38. In particular, a mechanical fastener 75 extends through the first segment 162 of the nut capture plug 160 and into the arm 41 of the telescope drive bracket 38. It is to be understood that other coupling methods may be employed to secure the nut capture plug 160 to the telescope drive bracket 38.

As shown best in the cross-sectional views of FIG. 10, each nut capture plug 160 includes a single tooth 170 that extends into one of the cavities 172 of each lateral portion 68 of the jackscrew nut 34. The tooth 170 has a shape that substantially corresponds to the geometry of the cavities 172, such that relative movement between the jackscrew nut 34 and the nut capture plug 160 is restricted or eliminated. In some embodiments, a press fit condition is provided by the size and shape of the tooth 170 and the cavities 172, thereby locking the jackscrew nut 34 in place, relative to the telescope drive bracket 38 in an assembled condition.

The embodiments disclosed herein prevent the jackscrew nut 34 from deforming and prevents rotation of the telescope drive bracket 38. Prior telescope actuator assembly designs allow for the telescope drive bracket 38 to rotate relative to the jackscrew nut 34 during an energy absorption event. This is avoided by adding the nut capture plug 60, 160, which is positioned in the axle cavities 72, 172 of the jackscrew nut 34. This anti-rotation plug eliminates the opportunity for the jackscrew nut 34 to rotate.

While the invention has been described in detail in connection with only a limited number of embodiments, it is to be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A steering column assembly comprising:
   a lower jacket;
   an upper jacket in telescoping engagement with the lower jacket; and
   a telescope actuator assembly comprising:
      a jackscrew nut translatable along a lead screw;
      a telescope drive bracket having a base portion and a pair of arms extending from the base portion, the pair of arms each defining a slot with a respective slot surface, wherein the jackscrew nut is disposed within the slots in an assembled condition to move the upper jacket in a telescope direction relative to the lower jacket; and
      a first nut capture plug coupled to one of the pair of arms, the first nut capture plug having at least one tooth disposed within a cavity on a first side of the jackscrew nut to prevent relative rotation between the jackscrew nut and the telescope drive bracket.

2. The steering column assembly of claim 1, further comprising a second nut capture plug coupled to the other of the pair of arms, the second nut capture plug having at least one tooth disposed within a cavity on a second side of the jackscrew nut to prevent relative rotation between the jackscrew nut and the telescope drive bracket.

3. The steering column assembly of claim 1, wherein the at least one tooth of the first nut capture plug consists of a pair of teeth, wherein each of the pair of teeth is disposed within a respective cavity on the first side of the jackscrew nut.

4. The steering column assembly of claim 3, wherein each tooth of the pair of teeth has a shape corresponding to the shape of the cavity within which they are disposed.

5. The steering column assembly of claim 4, wherein the pair of teeth are press fit within the cavities of the jackscrew nut.

6. The steering column assembly of claim 3, wherein the first nut capture plug is formed of powdered metal.

7. The steering column assembly of claim 1, wherein the at least one tooth of the first nut capture plug consists of a single tooth, wherein tooth is disposed within the cavity on the first side of the jackscrew nut.

8. The steering column assembly of claim 7, wherein the tooth has a shape corresponding to the shape of the cavity within which it is disposed.

9. The steering column assembly of claim 8, wherein the tooth is press fit within the cavity of the jackscrew nut.

10. The steering column assembly of claim 7, wherein the first nut capture plug is a stamped metal component.

11. A telescope actuator assembly comprising:
    a jackscrew nut translatable along a lead screw;
    a telescope drive bracket in contact with the jackscrew nut; and
    a nut capture plug coupled to the telescope drive bracket, the nut capture plug having a first tooth and a second tooth, the first tooth disposed within a first cavity on a side of the jackscrew nut, the second tooth disposed within a second cavity on the side of the jackscrew nut, wherein disposal of the first tooth and the second tooth within the first and second cavities prevents relative rotation between the jackscrew nut and the telescope drive bracket.

12. The telescope actuator assembly of claim 11, wherein each of the first tooth and the second tooth has a shape corresponding to the shape of the cavity within which they are disposed.

13. The telescope actuator assembly of claim 12, wherein the first and second tooth are press fit within the cavities of the jackscrew nut.

14. The telescope actuator assembly of claim 11, wherein the nut capture plug is formed of powdered metal.

15. A telescope actuator assembly comprising:
    a jackscrew nut translatable along a lead screw;
    a telescope drive bracket in contact with the jackscrew nut; and
    a nut capture plug coupled to the telescope drive bracket, the nut capture plug having a single tooth, the single tooth disposed within a cavity on a side of the jackscrew nut, wherein disposal of the single tooth within the cavity prevents relative rotation between the jackscrew nut and the telescope drive bracket.

16. The telescope actuator assembly of claim 15, wherein the single tooth has a shape corresponding to the shape of the cavity within which it is disposed.

17. The telescope actuator assembly of claim 16, wherein the single tooth is press fit within the cavity of the jackscrew nut.

18. The telescope actuator assembly of claim 15, wherein the nut capture plug is a stamped metal component.

* * * * *